US008891426B2

(12) United States Patent
Widegren

(10) Patent No.: US 8,891,426 B2
(45) Date of Patent: Nov. 18, 2014

(54) METHODS AND APPARATUSES RELATING TO MULTIMEDIA BROADCAST MULTICAST SERVICES

(75) Inventor: Ina Widegren, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 517 days.

(21) Appl. No.: 12/995,331

(22) PCT Filed: Apr. 20, 2009

(86) PCT No.: PCT/SE2009/050401
§ 371 (c)(1),
(2), (4) Date: Nov. 30, 2010

(87) PCT Pub. No.: WO2009/148383
PCT Pub. Date: Dec. 10, 2009

(65) Prior Publication Data
US 2011/0085488 A1 Apr. 14, 2011

Related U.S. Application Data

(60) Provisional application No. 61/059,314, filed on Jun. 6, 2008.

(51) Int. Cl.
*H04H 20/71* (2008.01)
*H04W 4/06* (2009.01)
*H04W 72/00* (2009.01)
*H04W 48/10* (2009.01)
*H04W 92/20* (2009.01)

(52) U.S. Cl.
CPC ............ *H04W 72/005* (2013.01); *H04W 48/10* (2013.01); *Y02B 60/50* (2013.01); *H04W 92/20* (2013.01)
USPC ........... 370/312; 370/331; 370/432; 370/252; 455/436

(58) Field of Classification Search
USPC .......... 370/252, 254, 312, 432, 328, 329, 338
See application file for complete search history.

(56) References Cited

U.S. PATENT DOCUMENTS 7,336,659 B2 * 2/2008 Meago .......................... 370/390
7,499,435 B2 3/2009 Kwak et al.
(Continued)

FOREIGN PATENT DOCUMENTS

CN 101032185 A 9/2007
CN 101141669 A 3/2008
(Continued)

OTHER PUBLICATIONS

3RD Generation Partnership Project. "LTE MBMS." 3GPP TS-RAN WG RAN2 #52, R2-060931, Athens, Greece, Mar. 27-31, 2006.
(Continued)

*Primary Examiner* — Candal Elpenord
(74) *Attorney, Agent, or Firm* — Coats & Bennett, PLLC

(57) ABSTRACT

In a flat Radio Access Network (RAN) architecture, each base station (16) shares Multimedia Broadcast Multicast Services (MBMS) control plane information with its neighboring base stations (16), by sharing with neighboring base stations (16) the same control plane information that the base station (16) transmits via its air interface (24). For example, in a Wideband CDMA embodiment, where each base station (16) in a flat WCDMA RAN (12) is referred to as a NodeB÷, one NodeB÷ shares MBMS control plane information with one or more neighboring NodeB+s. Such sharing allows a given base station (16-1) not only to broadcast MBMS configuration information for its own cells (18-1), but also to broadcast such information for one or more neighboring cells (18-2, 18-3) that operate under control of one or more neighboring base stations (16-2, 16-3). Thus, a user equipment (UE) (22) camping in the given base station's cell (18-1) is provided with the information needed to acquire the MBMS user plane in its current cell (18-1) and in one or more of the neighboring cells (18-2, 18-3). In this manner, the UE (22)—also referred to as a mobile terminal—can receive MBMS transmissions from multiple base stations (16-1, 16-2, 16-3), for selective and/or soft combining. UE reception performance is thereby improved and base stations (16) in a flat RAN (12) generally can send MBMS transmissions at a lower power.

20 Claims, 2 Drawing Sheets

(56) References Cited

U.S. PATENT DOCUMENTS

| | | | |
|---|---|---|---|
| 7,509,127 B2* | 3/2009 | Wang et al. | 455/439 |
| 8,068,843 B2* | 11/2011 | Yi et al. | 455/450 |
| 8,130,687 B2* | 3/2012 | Cai et al. | 370/312 |
| 8,165,166 B2* | 4/2012 | Fischer | 370/498 |
| 8,175,069 B2* | 5/2012 | Wang et al. | 370/343 |
| 8,175,090 B2* | 5/2012 | Vayanos et al. | 370/389 |
| 2005/0037768 A1* | 2/2005 | Hwang et al. | 455/450 |
| 2005/0054344 A1* | 3/2005 | Jung et al. | 455/432.3 |
| 2008/0273503 A1* | 11/2008 | Lee et al. | 370/336 |
| 2008/0274759 A1* | 11/2008 | Chen et al. | 455/507 |
| 2008/0287129 A1* | 11/2008 | Somasundaram et al. | 455/436 |
| 2010/0238903 A1* | 9/2010 | Kitazoe | 370/332 |

FOREIGN PATENT DOCUMENTS

| | | |
|---|---|---|
| EP | 1353523 A1 | 10/2003 |
| EP | 2061266 A1 | 5/2009 |

OTHER PUBLICATIONS

3RD Generation Partnership Project. "Interpretation of the 'Neighboring Cell Identity' in MBMS Neighboring Cell PTM RB Info." 3GPP TSG-RAN Meeting #62, R2-082647, Kansas City, USA, May 5-9, 2008.

3RD Generation Partnership Project. "MBMS Aspects in SAE/LTE Work." 3GPP TSG RAN WG3#, Tdoc R3-060652, Agenda item: 12.15.12, Shanghai, China, May 8-12, 2006.

3RD Generation Partnership Project. 3GPP TR 25.813, V7.1.0 (Sep. 2006). 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7). Sep. 2006.

3RD Generation Partnership Project. 3GPP TS 36.00, V8.4.0 (Mar. 2008). 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8). Mar. 2008.

Nokia Siemens Networks, et al. "TR R3.022 v0.3.0." 3GPP TSG-RAN WG3 Meeting #60, draft-R3-081595, Cansas, USA, May 5-9, 2008, pp. 1-26.

3rd Generation Partnership Project. "3rd Generation Partnership Project; Technical Specification Group Radio Access Network; Introduction of the Multimedia Broadcast Multicast Service (MBMS) in the Radio Access Network (RAN); Stage 2 (Release 8)." 3GPP TS 25.346, V8.1.0, Mar. 2008, Sophia Antipolis Valbonne, France, pp. 1-64.

3rd Generation Partnership Project."3rd Generation Partnership Project; Radio Resource Control (RRC); Protocol specification; Release 8." 3GPP TS 25.331, V8.2.0, Mar. 2008, pp. 1-1490.

* cited by examiner

METHODS AND APPARATUSES RELATING TO MULTIMEDIA BROADCAST MULTICAST SERVICES

TECHNICAL FIELD

The present invention generally relates to Multimedia Broadcast Multicast Services (MBMS), such as provided in a Wideband CDMA network, and particularly relates to MBMS control plane coordination across base stations in a flat-architecture Radio Access Network (RAN).

BACKGROUND

Multimedia Broadcast Multicast Services (MBMS) are known for hierarchical Radio Access Network (RAN) architectures. See, for example, the Technical Specifications (TSs) TS 25.331 v8.20 and TS 25.346 v8.1.0, as promulgated by the Third Generation Partnership Project (3GPP). For hierarchical RANs, the typical approach is to coordinate MBMS over multiple base stations—e.g., NodeBs—using a radio network controller or other higher entity within the RAN architecture. However, that type of centralized control is not available in flat RAN architectures.

Ongoing work, as embodied in the 3GGP RAN3 working group, provides further teachings related to improving MBMS selective and/or soft combining, and Single Frequency Network (SFN) operation, in flat network architectures. Particularly, one may refer to the 3GGP Technical Report identified as TR R3.022 v0.3.0 (2008-05). This ongoing work focuses on user plane synchronization in flat RANs, but does not address practical solutions for MBMS control plane coordination and synchronization.

SUMMARY

In a flat Radio Access Network (RAN) architecture, each base station shares Multimedia Broadcast Multicast Services (MBMS) control plane information with its neighboring base stations, by sharing with neighboring base stations the same control plane information that the base station transmits via its air interface (24). For example, in a Wideband CDMA embodiment, where each base station in a flat WCDMA RAN (12) is referred to as a NodeB+, one NodeB+ shares MBMS control plane information with one or more neighboring NodeB+s. Such sharing allows a given base station not only to broadcast MBMS configuration information for its own cells, but also to broadcast such information for one or more neighboring cells that operate under control of one or more neighboring base stations. Thus, a user equipment (UE) camping in a given base station's cell is provided with the information needed to acquire the MBMS user plane in its current cell and in one or more of the neighboring cells. In this manner, the UE—also referred to as a mobile station—can receive MBMS transmissions from multiple base stations, for selective and/or soft combining. UE reception performance is thereby improved and base stations in a flat RAN generally can send MBMS transmissions at a lower power.

In at least one embodiment, the teachings presented herein advantageously recognize that the RRC messages of the MCCH acquisition procedure, such as described in 3GPP TS 25.331 v8.2.0, contain all of the information a NodeB+ requires to be able to define and announce neighbor cells in the MCCH message, MBMS NEIGHBOURING CELL P-T-M RB INFORMATION. (P-T-M denotes point-to-multipoint.)

Accordingly, in one or more embodiments contemplated herein, a NodeB+ or other such base station in a flat RAN sends to one or more of its neighbor NodeB+s the same RRC messages that it sends over the air for the MCCH acquisition procedure. Preferably, these messages are sent over the standardized Iur interface between NodeB+s in a transparent manner. In this way, a given NodeB+ essentially receives the same RRC messages from a neighboring NodeB+, as it would if it was receiving over-the-air transmissions from that neighboring NodeB+'s MCCH.

In one aspect, a NodeB+ includes relevant RRC messages transmitted (or which are going to be transmitted) on the MCCH as part of a new Radio Network Subsystem Application Part (RNSAP) message/procedure as proposed herein, referred to as "MCCH Information Transfer." (RNSAP is a 3GPP protocol that may be used for inter-NodeB+ communications in a flat architecture.) In one embodiment, a new RNSAP class 2 procedure is used, where the message sent from one NodeB+ to another over the standard Iur interface contains the RRC messages of the MCCH acquisition procedure in 3GPP TS 25.331 v8.2.0, using an RRC "containers" technique. The exchange of such information is sufficient to support the required coordination of the MBMS session start.

Thus, in at least one embodiment, the teachings herein provide a new class 2 RNSAP procedure called "MCCH Information Transfer", defining a message called MCCH INFORMATION TRANSFER that enables one NodeB+ to send the RRC messages of the MCCH acquisition procedure 3GPP TS 25.331 v8.2.0 in RRC container(s) to a neighbor NodeB+. This allows each neighboring NodeB+ to provide UEs camping in its own cell with MBMS user plane configuration information for one or more neighboring cells that are under control of other NodeB+s.

However, it should be noted that the teachings herein are not limited to "RNSAP class 2 procedures," i.e. where no response is received in response to the message. In one or more embodiments, the teachings herein broadly provide for a first base station (e.g., NodeB+) in a flat network to share MBMS user plane configuration information with a second base station. For example, in a flat network, a first NodeB+ shares its MBMS user plane configuration information with a second NodeB+ by sending one or more messages to the second NodeB+. The message or messages indicate the identity of the cell(s) associated with the MBMS user plane configuration information, so that the receiving NodeB+ knows which cells are associated with the configuration information.

Further, such sharing is, in at least one such embodiment, based on sending one or more RRC containers to the second base station, via the standard inter-base station interface. These RRC containers transparently carry the RRC messages broadcasted by the first base station for the MCCH acquisition procedure. Thus, in at least one embodiment of the teachings presented herein, a new RNSAP message is defined as including RRC messages associated with the MCCH. Particularly, the RRC messages of interest for sharing between NodeB+s in a flat WCDMA network are those related to the MCCH acquisition procedure. Such RRC messages at least include: MBMS MODIFIED SERVICES INFORMATION; MBMS COMMON P-T-M RB INFORMATION; and MBMS CURRENT CELL P-T-M RB INFORMATION. The shared RRC messages also can include MBMS NEIGHBOURING CELL P-T-M RB INFORMATION.

Also included herein are teachings related to handling counting and switching between p-t-m (point-to-multipoint) and p-t-p (point-to-point) configurations and reporting such changes.

Further, the teachings presented in this document extend to muticast/broadcast in Single Frequency Networks (SFNs), which is denoted as MBSFN.

DETAILED DESCRIPTION

Figure 1:
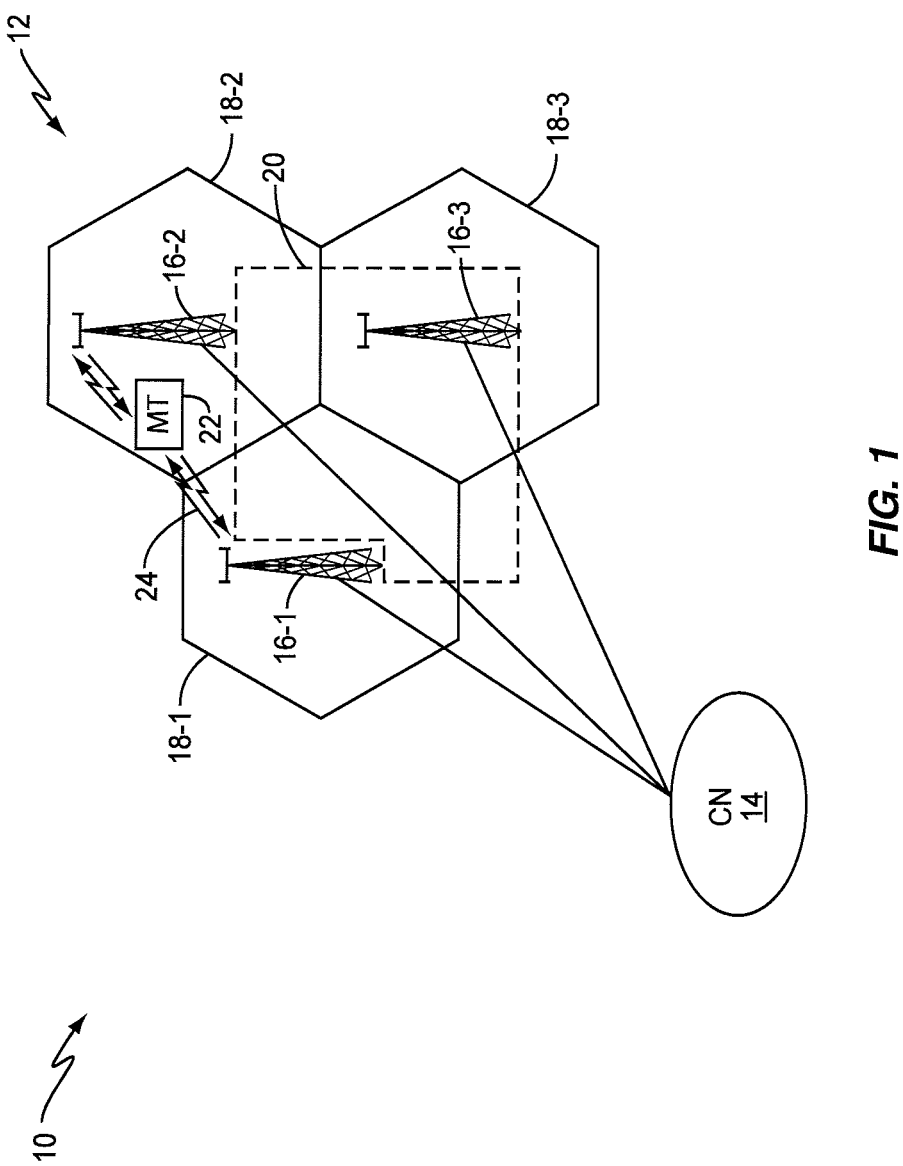
FIG. 1 is a simplified block diagram of one embodiment of a wireless communication network, having a flat-architecture RAN and configured for inter-base station MBMS configuration information sharing as taught herein.

FIG. 1 illustrates an example wireless communication network 10, that includes a "flat architecture" Radio Access Network (RAN) 12, which is coupled to a Core Network (CN) 14 that provides communication links to one or more external networks or systems (not shown). Base stations 16 within the RAN 12 provide radio coverage over given, potentially overlapping service areas. For example, a base station 16-1 controls one or more cells 18-1, a base station 16-2 controls one or more cells 18-2, a base station 16-3 controls one or more cells 18-3, and so on. An inter-base station interface 20 communicatively links the various base stations 16 together. Note that "base station 16" and "cell 18" are used generically, when numbering suffixes are not needed to distinguish one cell or base station from another.

By way of non-limiting example, the network 10 comprises a Wideband Code Division Multiple Access (WCDMA) network, and the base stations 16 comprise "NodeB+" base stations configured for WCDMA operation. The network 10 provides communication services to user equipment (UE), such as mobile stations 22. In particular, the network 10 provides Multimedia Broadcast Multicast Services (MBMS) to mobile stations 22, using point-to-point (p-t-p) transmissions, point-to-multipoint (p-t-m) transmissions, or some combination of both, depending on how many mobile stations 22 are receiving MBMS transmissions in the given cells 18. Each base station 16 includes or otherwise provides an air interface 24, used for transmitting and receiving wireless signals to and from the mobile stations 22 or other user equipment.

With p-t-p transmission, a given base station 16 transmits MBMS data to a given mobile station 22 using a traffic channel dedicated to that mobile station 22. With p-t-m transmission, a given base station 16 broadcasts MBMS data to multiple mobile stations 22 on a broadcast channel that is commonly received by those mobile stations 22. Advantageously, the teachings disclosed in this document provide for sharing of MBMS control plane data between base stations 16, so that a given mobile station 22 in one cell 18 can acquire MBMS signals being transmitted within another cell 18 of the RAN 12.

In more detail, each base station 16 provides MBMS to mobile stations 22 operating in the cell(s) 18 controlled by the base station 16, based on transmitting MBMS data over the base station's air interface 24, along with transmitting control information needed by the mobile stations 22 to acquire MBMS within those cells 18. A given mobile station 22 "camps" in a given cell 18, and receives control information for that cell 18 from the base station 16 that controls that cell 18. This control information includes RRC messages transmitted over the base station's air interface 24 that provide the MBMS user plane configuration information necessary for the mobile stations 22 in the cell 18 to acquire the Multicast Control Channel (MCCH) being broadcast in the cell 18. However, because the mobile stations 22 do not camp in more than one cell 18 at a time, they conventionally do not receive MBMS user plane configuration information for neighboring cells 18 operating under control of other base stations 16. Conventionally, then, the mobile stations 22 would therefore be unable to receive MBMS from more than one base station 16 at a time within the flat-architecture RAN 12.

Advantageously, however, the sharing of MBMS user plane configuration information between neighboring base stations 16 allows a given mobile station 22 to acquire the MCCH in different cells 18 operating under control of different base stations 16. As such, the mobile station can tune into or otherwise receive the MBMS data from more than one base stations 16 at a time. In more detail, a first base station 16-1 operates in a flat architecture RAN 12, and is configured to transmit one or more Radio Resource Control (RRC) messages via its air interface 24, for providing user equipment— e.g., one or more mobile stations 22—with MBMS user plane configuration information, for one or more cells 18 controlled by the first base station 16-1.

Further, the first base station 16-1 is configured to share that MBMS user plane configuration information with a neighboring second base station 16-2 by sending the one or more RRC messages to the second base station 16-2 via an inter-base station interface 20. Additionally, or alternatively, the first base station 16-1 shares the MBMS user plane configuration information with the base station 16-3, based on sending the RRC messages to the base station 16-3 via the inter-base station interface 20. In a WCDMA example, the inter-base station interface is the standardized Iur interface that communicatively couples NodeB+s together, and allows one NodeB+ to signal another one.

Figure 2:
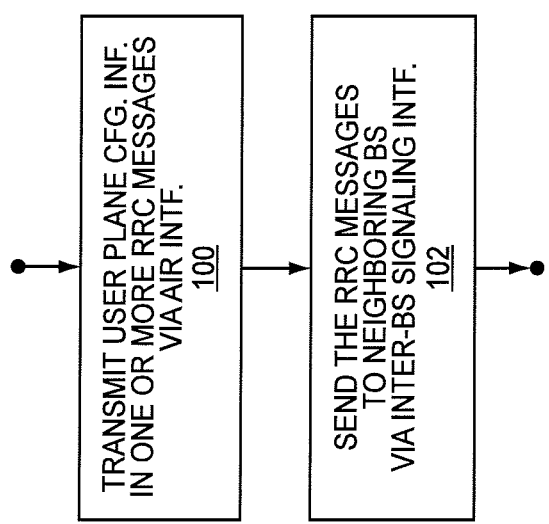
FIG. 2 is a logic flow diagram of one embodiment of a method of sharing MBMS configuration information between neighboring base stations.

FIG. 2 illustrates a method embodiment of the above-described sharing operations. According to the illustrated processing, the first base station 16-1 transmits MBMS user plane configuration information in one or more RRC messages via its user interface (Block 100). The base station 16-1 also sends those same RRC messages to the neighboring second base station 16-2 (or 16-3) via the inter-base station interface 20 (Block 102). Of course, it should be understood that the process flow of FIG. 2 can be reordered, such that the first base station 16-1 sends the RRC messages to the second base station 16-2, and then transmits them via its air interface 24. In general, the RRC messages shared between base stations 16-1 and 16-2 are the same RRC messages that have been or will be transmitted to mobile stations 22 via the air interface 24. For example, in one or more embodiments, the first base station 16-1 is configured to receive MBMS user plane configuration information from the second base station 16-2. That information has or will be transmitted over the air interface 24 of the second base station 16-2, for providing user equipment with MBMS user plane configuration information for a cell 18 controlled by the second base station 16-2. The first base station 16-2 correspondingly transmits information in a cell 18 controlled by the first base station 16-1, indicating the MBMS user plane configuration information for the cell 18 controlled by the second base station 16-2.

In at least one embodiment the RRC messages sent from the first base station 16-2 to the second base station 16-2 via the inter-base station interface 20 are the same RRC messages transmitted over the air interface 24 of the first base station 16-1, for Multicast Control Channel, MCCH, acquisition by a user equipment in one or more cells 18 controlled by the first base station 16-1. As an example, the first base station 16-1 transmits RRC messages via its air interface in the cell 18-1, where those RRC messages convey the configuration information needed for a mobile station 22 to acquire the MCCH being transmitted by the first base station 16-1 in the cell 18-1. By also sending those RRC messages to the second base station 16-2, that second base station 16-2 can transmit said configuration information over its air interface 24, along with transmitting its own MCCH acquisition information for the cell 18-2. Thus, mobile stations 22 camping in the cell 18-2 receive MCCH acquisition information for cell 18-2 and for cell 18-1. This added MCCH acquisition information allows such mobile stations 22 to acquire MBMS service from both cells 18-2 and 18-1, such as in a diversity/soft handoff configuration, for example.

Thus, in at least one embodiment, the first base station 16-1 is configured to receive RRC messages sent by the second base station 16-2 via the inter-base station interface 20, wherein those RRC messages are the same RRC messages transmitted over the air interface 24 of the second base station 16-2, for MCCH acquisition by user equipment in one or more cells 18 controlled by the second base station 16-2. Further, the first base station 16-1 is configured to transmit MBMS user plane configuration information for the second base station 16-2 over the air interface 24 of the first base station 16-1, and wherein the second base station 16-2 transmits MBMS user plane configuration information for the first base station 16-1 over the air interface 24 of the second base station 16-2.

As for sending the RRC messages, in one or more embodiments the first base station 16-1 sends the one or more RRC messages to the second base station 16-2 by placing MCCH acquisition procedure RRC messages into one or more RRC message containers. The first base station 16-1 then sends the RRC message containers to the second base station 16-2 in one or more Radio Network Subsystem Application Part (RNSAP) messages.

Additional information is shared between base stations 16 in one or more embodiments contemplated in this document. For example, in at least one embodiment, the first base station 16-1 is configured to share with the second base station 16-2 information about the number of mobile stations 22 or other user equipment receiving MBMS traffic from the first base station 16-1. Further, in at least one such embodiment, the first base station 16-2 is configured to determine whether to change from p-t-m transmission of MBMS traffic to p-t-p transmission of MBMS traffic, based at least in part on receiving information from the second base station 16-2 about the number of mobile stations 22 or other user equipment receiving MBMS traffic from the second base station 16-2. Additionally, in at least one such embodiment, the first base station 16-1 is configured to determine whether to change from p-t-p transmission of MBMS traffic to p-t-m transmission of MBMS traffic, based at least in part on receiving information from the second base station 16-2 about the number of mobile stations 22 or other user equipment receiving MBMS traffic from the second base station 16-2.

In addition to sharing MBMS user plane configuration information, base stations 16 may share additional, related information. For example, in one embodiment the first base station 16-1 is configured to send cell identity information as part of or in association with sending the one or more RRC messages to the second base station 16-2. The cell identity information indicates to the second base station 16-2 the identities of the cells 18 associated with the MBMS user plane configuration information being shared.

Figure 3:
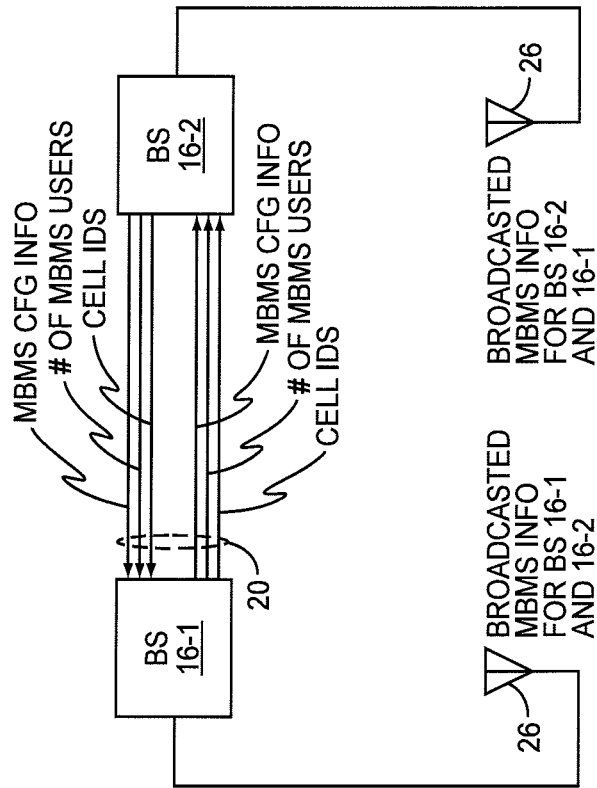
FIG. 3 is a block diagram of one embodiment of base stations exchanging MBMS configuration information via an inter-base station interface.

FIG. 3 illustrates one contemplated embodiment of sharing where the base station 16-1 uses the inter-base station interface 20 to send MBMS user plane configuration information to the second base station 16-2, and to send associated cell IDs and information about the number of MBMS users being supported by the first base station 16-1 in the identified cells 18. More particularly, the base station 16-1 shares with the base station 16-2 the RRC messages broadcasted—e.g., from antenna(s) 26—over the air interface of the base station 16-1, for acquisition of the MCCH being transmitted by the base station 16-1 in one or more cells 18 controlled by the base station 16-1. Likewise, the base station 16-2 may be configured to share such information with base station 16-1, and it should be understood that such sharing can be carried out between any given number of neighboring base stations 16. This arrangement allows both base stations 16 to transmit MBMS user plane configuration information for one or more neighboring cells, in addition to transmitting their own MBMS user plane configuration information.

Example Neighboring Cell Information Message Transmission

In a more detailed example embodiment, a given base station 16 transmits neighboring cell MBMS user plane configuration information by sending RRC messages that include such information. In particular, a base station 16-1 receives MBMS user plane configuration information from a neighboring base station 16-2, along with associated information about MBMS user numbers, and it transmits such information, to enable a user equipment (UE) to perform selective or soft combining of MBMS signals from both of the base stations 16-1 and 16-2. Particularly, the base station 16-1 transmits an RRC message denoted as the MBMS NEIGHBOURING CELL P-T-M RB INFORMATION message. Here, "RB" denotes "Radio Bearer." This message includes references to the RRC message MBMS COMMON P-T-M RB INFORMATION, which is sent on the MCCH before the MBMS NEIGHBOURING CELL P-T-M RB INFORMATION message. The UE has to read both messages to retrieve the information about neighboring cells 18 required for selective/soft combining. These messages provide the UE with: (1) neighboring cell identity; (2) secondary CCPCH physical configuration (e.g. scrambling code, channelization code); (3) type of combining: L2 or L1 (with or without combining schedule); (4) L23 configuration; and (5) timing offset.

The above information about neighbor cells 18 is sent out on the MCCH in the UE's current cell 18 by the base station 16 that controls that current cell 18. For the UE to be able to combine the Multicast Traffic Channel (MTCH) from different cells 18 controlled by different base stations 16, all the above information about those different neighbor cells needs to be available to the UE. Of course, the above information has to be connected to the right MBMS session—as indicated by the Temporary Mobile Group Identity (TMGI). This is done using the MBMS p-t-m RB information together with information in RRC messages MBMS MODIFIED SERVICES INFORMATION (and MBMS UNMODIFIED SERVICES INFORMATION) sent before the MBMS NEIGHBOURING CELL P-T-M RB INFORMATION message. The MBMS p-t-m RB information is found in the MBMS CURRENT CELL P-T-M RB INFORMATION message if MBMS NEIGHBOURING CELL P-T-M RB INFORMATION message signals that the same L23 configuration shall be used in the neighboring cell 18 as in the current cell 18, or that information is explicitly signaled in the MBMS NEIGHBOURING CELL P-T-M RB INFORMATION message.

The following RRC messages on the MCCH contain all necessary information needed to control selective or soft combining between neighbor cells 18: MBMS MODIFIED SERVICES INFORMATION; MBMS COMMON P-T-M RB INFORMATION; MBMS CURRENT CELL P-T-M RB INFORMATION; and MBMS NEIGHBOURING CELL P-T-M RB INFORMATION. In one or more embodiments, these messages are part of the MCCH acquisition procedure, as defined in Section 8.7.2 of 3GPP TS 25.331 v8.2.0. In the general case, a given UE needs information from all such messages, for selective or soft combining of MBMS traffic signals from two or more cells 18 under the control of different base stations 16.

Multimedia Broadcasting in Single Frequency Networks (MBSFN)

The following apply to MBSFN in Frequency Division Duplex (FDD), as set forth in 3GPP TS 25.331 v8.2.0 and 3GPP TS 25.346 v8.1.0: (1) an MBSFN cluster is a set of cells 18 operating in MBSFN mode and providing only MBMS service in p-to-m mode—this cluster is seen as one cell by any given UE; (2) the MBSFN transmission occupies an entire carrier; (3) counting and p-t-p establishment procedures are not supported for a cell 18 operating in MBSFN mode; (4) the cells 18 in a MBSFN cluster belong to different MBMS service areas compared to the cells 18 of a carrier providing unicast service; (5) the minimum MBMS service area must be equal to one MBSFN cluster; and (6) an MBMS bearer service must be transmitted in a complete MBSFN cluster.

For MBSFN in flat architecture, such as the RAN 12, the issue is to send the user plane (MTCH) and the control plane (i.e. MCCH and BCCH) with the same content and synchronized in time. P-t-p/p-t-m modes and counting are not issues, as only p-t-m is used in the SFN.

Control Plane Coordination for Soft Combining of Inter-base Station Cells

Assume that one or more UEs are currently in a cell 18-1 that is controlled by a given first base station 16-1. For that base station 16-1 to enable those UEs to perform selective or soft-combining of the MBTCH transmitted by the base station 16-1 in the current cell 18-1, with the MBTCH transmitted by another base station 16-2 in a neighboring cell 18-2, the base station 16-1 must transmit to those UEs the MBMS control plane information for cell 18-2. Thus, the base station 16-1 needs to have certain information about the cell 18-2, as controlled by the base station 16-2. Particularly, the base station 16-1 needs to have the following information per MBMS session (TMGI): the neighboring cell's identity; the physical configuration of the Secondary CCPCH (e.g. scrambling code, channelization code); the L23 configuration (including MBMS Logical Channel ID); the type of combining: L2 or L1 (L1 with or without combining schedule); and the timing offset.

Depending on the soft combining scheme and multiplexing type, some or all of the above information may be preconfigured in the base station 16-1. For example, it is known from Chapter 6.2.3.1.2 "O&M Solution for Parameter Allocation" in TR R3.022, to pre-configure a NodeB+ with default information for a neighboring cell. The solution does not exchange information between neighboring NodeB+s, and relies completely on pre-configuring the neighboring nodes. The method is feasible only in limited multiplexing and combining scenarios, and the following limitations apply:

(1) only possible for MAC multiplexing;
(2) not possible for L1 multiplexing, i.e. one S-CCPCH must support all MTCH in a cell 18. If more than one S-CCPCH is used, information about mapping of an MBMS session to a selected S-CCPCH is unpredictable and can not be preconfigured; and
(3) not possible for Soft (L1) Combining because on the MAC level there is an "MBMS-ID" within the MAC headers. The MBMS-ID is the same as the RRC MBMS Logical Channel ID that is assigned by a NodeB+, which is unique for each MBMS session when MAC multiplexing is used. This means that the MAC frames differ from cell-to-cell when MAC multiplexing is used. For soft (L1) combining to work, MAC frames have to be identical. For Selective (L2) combining, the MAC layer is independent between cells 18. Hence, there is no issue if different MBMS logical channels are used in the different neighboring cells 18.

A given base station 16—e.g., a given NodeB+—retrieves the required neighboring information as follows. For physical configuration, the configuration of S-CCPCH in the cells 18 of a NodeB+ have to be copied to all NodeB+s for which there is a neighbor cell relation. This physical channel configuration can then be contained in the MBMS COMMON P-T-M RB INFORMATION message transmitted by the given NodeB+, with references from the MBMS NEIGHBOURING CELL P-T-M RB INFORMATION message also sent by the given NodeB+.

For L23 configuration, as suggested, the complete L23 configuration is configured so that the same configuration is always used. The configuration can be enhanced with a QoS mapping that unambiguously defines the L23 configuration for different QoS profiles. In the MBMS NEIGHBOURING CELL P-T-M RB INFORMATION message, the ">CHOICE L23 CONFIGURATION; >>SAME AS CURRENT CELL" is always used. The MBMS Logical Channel ID is not required to know the values used in neighbor cells 18 of another NodeB+. As for the type of combining, that can be hardcoded to L2. Also, because synchronization is supported by a common reference time available in all NodeB+s, the timing offset between NodeB+s can be regarded as a constant and can correspondingly be set as configured Operations & Maintenance (O & M) values.

Thus, for certain scenarios limited to configuration selective combining and MAC multiplexing, neighboring NodeB+s do not need to exchange MBMS configuration information—such information can be preconfigured in the NodeB+s. However, the teachings presented in this document are needed in other scenarios. For example, if L1 multiplexing is used, each MBMS session uses its own S-CCPCH. Configuration of the physical channel using O & M is not possible in such cases, because the mapping of an MBMS session to a physical channel in a cell 18 cannot easily be predicted. For example, the mapping depends on the service areas configured for a given cell 18, which may differ between cells 18. These teachings extend the concept of O & M configuration, by adding the ability to send the S-CCPCH configuration information from one NodeB+ to another, neighboring NodeB+, using the Iur interface between them. That exchange may be done when a new MBMS session has been setup and a new S-CCPCH has been allocated. Such a method supports the following combining and multiplexing schemes: soft combining/L1 multiplexing; selective combining/L1 multiplexing; and selective combining/MAC multiplexing.

However, such a method would not support soft combining plus MAC multiplexing because sharing information about the configuration of neighbor cells 18 after the MBMS session is setup does not solve the problem of mismatching MBMS-IDs in the MAC headers. As such, coordination of MBMS Logical Channel ID/MBMS-ID has to be done prior to the establishment of the MBMS session.

Retrieving the required neighbor information

A given NodeB+ retrieves the required neighbor cell information as below:

for the physical configuration: when a new MBMS session is set up, the configuration of S-CCPCH in the cells of a NodeB+ has to be transferred over Iur to all NodeB+ for which there is a neighbor cell relation. This physical channel configuration can then be contained in the MBMS COMMON P-T-M RB INFORMATION message and have a reference from the MBMS NEIGHBOURING CELL P-T-M RB INFORMATION message.

for the L23 configuration for soft combining: the complete L23 configuration (including MBMS Logical Channel Id) has to be configured so that the same configuration is always used. The configuration can be enhanced with a QoS mapping that unambiguously defines the L23 configuration for different QoS profiles. In MBMS NEIGHBOURING CELL P-T-M RB INFORMATION the ">CHOICE L23 configuration; >>Same As Current cell" is always used.

for the L23 configuration for selective combining: either the complete L23 configuration is configured as described for Soft Combining above or it is individual per cell (except for RLC information that has to be the same in all combined cells and therefore configured). In the latter case the configuration of L23 has to be transferred over Iur to all NodeB+ for which there is a neighbor cell relation together with the configuration of S-CCPCH. In MBMS NEIGHBOURING CELL P-T-M RB INFORMATION the ">CHOICE L23 configuration; >>Different" together with the transport channel and RB information is selected.

Note, too, that the given NodeB+ does not need to know the MBMS Logical Channel IDs used in the neighboring NodeB+s, at least in the case of selective combining plus MAC multiplexing. Further, the type of combining can be hard-coded to either L1 or L2, and timing offsets can be regarded as constant and pre-configured as part of O & M.

Thus, for the configurations soft combining/L1 multiplexing, selective combining/L1 multiplexing, and Selective combining/MAC multiplexing, the configurations of neighbor cells are transferred over Iur after a new MBMS session has been set up and a new S-CCPCH has been allocated in cells. Thereafter the inter NodeB+ neighbors may be announced on the MCCH.

The MBMS configuration information sharing presented herein provides for coordination of MAC level prior to MBMS session start. As noted, soft combining at a given UE of MTCH data from different cells 18 under control of different base stations 16 requires identical MAC frames, otherwise the L1 combining will not work. This requirement is an issue if MAC multiplexing is used together with soft combining.

However, it is contemplated herein to extend the concept of O & M configuration according to a function that informs a given NodeB+ of which MBMS Logical Channel ID to use, prior to the reception of an MBMS session start. This embodiment of the sharing method allows soft combining/MAC multiplexing, but it cannot be used if L1 multiplexing is used. That is, it cannot be used where one S-CCPCH must support all MTCHs being transmitted in a given cell 18.

To understand configuration information sharing required in the above context, it may first be noted that the S-CCPCHs of a given NodeB+ are configured via O & M operations. The S-CCPCH of the cell(s) controlled by a given NodeB+ must be copied to all NodeB+s having a neighbor relation to that given NodeB+. In one approach, all such physical channel configuration can be contained in the MBMS COMMON P-T-M RB INFORMATION message and have a reference from the MBMS NEIGHBOURING CELL P-T-M RB INFORMATION message.

Further, the complete L23 configuration has to be configured so that the same configuration is always used. The configuration can be enhanced with a QoS mapping that unambiguously defines the L23 configuration for different QoS profiles. In the MBMS NEIGHBOURING CELL P-T-M RB INFORMATION message, the ">CHOICE L23 configuration; >>Same As Current cell" is always used.

Still further, for MBMS Logical Channel ID soft combining, the NodeB+ needs to have knowledge of the MBMS Logical Channel ID to be used for the next MBMS session, prior to the session start. All NodeB+s controlling cells 18 that are neighbor cells 18 thus need to have the same information of the "next MBMS Logical Channel ID". As before, the type of combining is hard-coded to L1 or L2, and no dynamic selection of type combining is used. Also as before, the timing offsets may be configured via O & M operations.

Thus, to support soft combining/MAC multiplexing, a given NodeB+ needs to have knowledge of next MBMS logical channel to use prior to reception of an MBMS session start message. After establishment of the MBMS session there is no need to transfer configuration info over the Iur interface between neighboring NodeB+s. Finally, as detailed later herein, there is also the possibility of using L1 multiplexing together with MAC multiplexing—i.e., using several S-CCPCHs, where several MBMS sessions are multiplexed onto each S-CCPCHs using MAC-multiplexing.

Coordination of Counting and RB Configuration (p-t-m/p-t-p)

In the context of this document, an inter-base station neighbor cell is one controlled by another base station 16. For example, two adjacent cells 18-1 and 18-2 are inter-base station neighboring cells if they are controlled by different base stations 16-1 and 16-2. Thus, a given base station 16-1 provides mobile stations 22 operating in one of its cells 18-1 with the ability to use MTCH transmissions in an inter-base station neighboring cell 18-2 for selective and/or soft-combining, based on indications sent by the base station 16-1 on its MCCH. Particularly, the base station 16-1 transmits such information on its MCCH using MBMS NEIGHBOURING CELL P-T-M RB INFORMATION message.

Further, the teachings proposed in this document provide for radio bearer (RB) configuration control, in terms of a given base station 16 determining whether to transmit an MTCH using p-t-m or p-t-p. In particular, those skilled in the art will appreciate that the Radio Network Subsystem (RNS) controlled by a given base station 16 can be appreciably smaller than the overall service area over which UEs can perform selective and/or soft combining of MBMS signals. In other words, in a flat RAN, a given UE may be able to receive MBMS signals from two, three, or more cells 18. Each such cell 18 may be controlled by a different base station 16, e.g., by a different NodeB+.

Given this possibility, it is proposed herein that a given base station 16 does more than simply count the number of its UEs receiving or requesting MBMS. More particularly, the MBMS transmissions in one cell 18-1 may be used by UEs in another cell 18-2 for selective and/or soft combining. As such, a given base station 16-1 controlling MBMS transmission in the cell 18-1 should base its determination of whether to transmit MBMS data using p-t-m or p-t-p not only on the number of UEs in the cell 18-1 to which it is providing MBMS, but also on the number of other-cell UEs that may be using its MBMS transmissions for selective and/or soft combining. Without such consideration, the counting of interested UEs by a given NodeB+ will not be complete and there is a risk that the counting algorithm of a particular NodeB+ (current NodeB+) will underestimate the number of interested UEs using radio resources in the cells of the current NodeB+, as UEs using the cells only as neighbors for selective/soft combining are invisible to the current NodeB+.

Correspondingly, in one proposed method embodiment, a first base station 16-1 shares with a second base station 16-2 information about the number of mobile stations 22 or other UEs receiving MBMS traffic from the first base station 16-1. Further, the first base station 16-1 determines whether to change from p-t-m transmission of the MBMS traffic to p-t-p transmission of the MBMS traffic, based at least in part on receiving information from the second base station 16-2 about the number of mobile stations 22 or other UEs receiving MBMS traffic from the second base station 16-2. The first base station 16-1 also determines whether to change from p-t-p transmission of MBMS traffic to p-t-m transmission of the MBMS traffic, based at least in part on receiving information from the second base station 16-2 about the number of mobile stations 22 or other UEs receiving MBMS traffic from the second base station 16-2.

In one embodiment, it is proposed that, when a NodeB+ is counting UEs interested in a particular MBMS session, it shall be possible to include UEs that have reported interest in the MBMS session on an RRC connection in an Inter NodeB+ neighbor cell. When a current NodeB+ decides to change an MBMS radio bearer configuration, from p-t-m to p-t-p or vice versa, that also changes the allowed neighbor cells to be announced on MCCH in the MBMS NEIGHBOURING CELL P-T-M RB INFORMATION message from a neighbor NodeB+. The allowed cells change because cells using p-t-p radio bearer configuration shall not be included in the list for selective/soft combining. Thus, coordination of the neighbor cells allowed for selection and/or soft combining in the MBMS NEIGHBOURING CELL P-T-M RB INFORMATION message has to be performed between NodeB+s.

In one embodiment, a NodeB+ (current NodeB+) that is controlling cells 18 that are inter NodeB+ neighbor cells for one or more other NodeB+s shall report its radio bearer configuration (p-t-p/p-t-m) over the Iur interface to all such neighboring NodeB+s.

Control Plane Synchronization for MBSFN

As described in the document R3-081595, 3GPP TR R3.022 V0.3.0 (2008-05) discloses an approach to user plane (MTCH) synchronization that is usable in MBSFN mode. However, it is recognized in this document that control plane synchronization for MBSFN means that MBSFN cells also have to transmit the MCCH and BCCH with the same accuracy as used for MTCH synchronization. This requirement means that the content of each frame containing MCCH (or BCCH) information has to be identical and sent out in synchronized fashion in all cells of the MBSFN cluster.

For BCCH it is assumed that O & M operations are used to configure the NodeB+s of an SFN cluster with identical attributes. Supported by the common reference time available in all NodeB+s, the BCCH can be synchronized both regarding time and content.

A more challenging issue is achieving MCCH synchronization. The Radio Access Network Application Part (RANAP) message MBMS Session Start triggers a change of the MCCH message content. It is sent over the Iu interface from one or more Serving GPRS Support Nodes (SGSNs) to each NodeB+ in the cluster. SGSN and Iu control plane are not assumed to be synchronized to the common reference time, hence different NodeB+s may receive the MBMS session start at different points in time (with a deviation of more than one Transmission Time Interval or TTI). The MCCH update therefore is at risk of being unsynchronized.

Further, there is an issue regarding how to set the S-CCPCH configurations if L1 multiplexing is also used for the MBSFN case. In an MBSFN cluster, for the case of MAC-multiplexing, the MBMS logical channels to be used have to be coordinated in the same way as described above. However, this disclosure provides teachings that avoid limitations regarding SGSN and Iu control plane configuration when MBSFN is used in flat architecture with an MBSFN cluster that is bigger than the coverage area of one NodeB+. To avoid such limitations, it is proposed that all NodeB+s controlling cells of an MBSFN cluster shall send identical and synchronized content on the MCCH with accuracy as set forth in Chapter 6.2.3.1.2 of 3GPP TR R3.022 V0.3.0. The exact point in time when the MCCH is updated shall not depend on timing of the Iu control plane signaling (i.e. the exact time of reception of MBMS session start message).

Configuration of External Neighbors

For the proposed selective and/or soft combining of MBMS signals across inter-NodeB+ neighbor cells, each NodeB+ must have MBMS configuration for its inter-NodeB+ neighbor cells. Particularly, at least the following configured information is needed for each external cell:

cell identity to be used when communicating over Iur;
identity of controlling NodeB+ and node address to use over Iur;
list of service area identities that are mapped to the external cell;
supported functionality in terms of combining method (L1 and/or L2) and multiplexing method (MAC and/or L1), etc.; and
preconfigured attributes as described earlier herein.

Further, neighbor relations for the cells controlled by a given NodeB+ (its own cells) have to be configured. The following information is needed for each own cell:

cell identity to be used when communicating over Iur;
for each service area mapped to the own cell a list of NodeB+ that has defined this cell as a neighbor cell; and node address to use over Iur for the NodeB+ in the above list.

Note that a neighbor relation is only configured between cells that have at least one MBMS service area in common. An alternative solution is to configure neighbor cells without considering the service area. The consequence is that unnecessary RNSAP messages would be sent but the merits are a simplified configuration.

Coordination of Neighbor Cell Configuration

For the inter-cell coordination contemplated in this document, each NodeB+ needs to define and announce neighbor cell configurations. A given NodeB+ can send MCCH messages in its own cells, to provide UEs in its own cells with MBMS user plane configuration information for one or more neighboring cells. Advantageously, the information needed by a given UE to use MBMS transmissions in another cell is wholly provided by the RRC messages sent in the other cell for MCCH acquisition. More particularly, the RRC messages of the MCCH acquisition procedure 3GPP TS 25.331 v8.2.0 contain all required information a NodeB+ needs to define and announce neighbor cells in the MCCH message MBMS NEIGHBOURING CELL P-T-M RB INFORMATION, transmitted by it.

This document therefore proposes a new RNSAP class 2 procedure in 3GPP TS 25.331 v8.2.0, where the message sent from a first NodeB+ to a second NodeB+ contains the RRC messages sent (or to be sent) by the first NodeB+ over its air interface, for supporting the MCCH acquisition procedure. The RRC messages sent to the second NodeB+ are sent based on using the RRC container(s) technique. This approach is sufficient to support the required coordination of the MBMS session start. More particularly, a new class 2 RNSAP procedure is introduced herein, referred to as "MCCH Information Transfer." This new procedure defines a message MCCH INFORMATION TRANSFER that enables one NodeB+ to send the RRC messages of the MCCH acquisition procedure—as defined in 3GPP TS 25.331 v8.2.0—in RRC container(s) to a neighbor NodeB+.

The RNSAP needs to include the configured cell identity, used when communicating over the Iur interface, for the cell in which the MCCH RRC messages were sent. One important aspect in one or more embodiments of the teachings herein is to include RRC messages, as coded with ASN.1, into the RNSAP (Iur) messages in a transparent way. This can be achieved as both RNSAP and RRC are coded with ASN.1 principles. Therefore the RNSAP message information structure includes the RRC message coded in exactly the way it is specified in 3GPP TS 25.331 v8.2.0. The sender then does not have to code another information structure for the RNSAP message containing the same information but with another coding.

The RRC messages can be included in one big RRC container Information Element (IE) containing several RRC messages in one structure. Alternatively, they can be sent using individual RRC container IEs, each containing only one RRC message. An alternative to including complete RRC messages in RRC container IE(s), is to use the individual IEs of the RRC messages and include them in the new RNSAP message as individual elements. The basic functionality will work the same as described in this document. It is also possible to have a mixed approach, where one or more RRC messages (preferably MBMS COMMON P-T-M RB INFORMATION and/or MBMS CURRENT CELL P-T-M RB INFORMATION) are included in RRC container IE(s) and selected IEs from other RRC messages are included in the new RNSAP message as individual elements.

Yet another alternative is to concatenate all cells for which information shall be sent to neighbor NodeB+ in one RNSAP message. The structure will then be a list of cells (with cell identity) for each cell with one or several RRC containers.

NodeB+ Actions when Receiving MBMS Session Start

A given NodeB+ takes the following actions in response to receiving MBMS session start:
  setup the MBMS session in its own cells in the same way as done in classical architecture (e.g., as in TS 25.331);
  identify the own cells that are included in the MBMS service areas in which the MBMS session is setup;
  setup the MBMS session in these cells announcing the MBMS session on MCCH;
  identify for each cell identified in second step above, and for each service area in the cell, a list of NodeB+ that has configured the cell as an external cell—i.e., a neighboring cell to be used by UEs in one or more other cells;
  send the RNSAP MCCH INFORMATION TRANSFER message to all neighbor NodeB+s identified in the preceding step, which contains a copy of the messages that were sent by the NodeB+ out over the Uu interface—the air interface—on the above-referenced MCCH; these messages are sent in one or more RRC container(s) plus the configured cell identity, used when communicating over Iur, for the cells mentioned in the third step above.

NodeB+ Actions when Receiving the MCCH INFORMATION TRANSFER Message

A given NodeB+ takes the following actions in response to receiving an MCCH INFORMATION transfer message:
  use the information in the RNSAP message and the RRC container(s) to identify valid neighbor cells for soft/selective combining in the NodeB+ that is sender of the message for each new MBMS session;
  retrieve the S-CCPCH configuration in the neighbor cells identified in the message; and
  update the MBMS COMMON P-T-M RB INFORMATION message with the retrieved S-CCPCH configuration information, and announce the neighbor cells by transmitting the MBMS NEIGHBOURING CELL P-T-M RB INFORMATION message over its air interface. The NodeB+ transmits these RRC messages on the MCCH according to normal rules of 3GPP TS 25.331 v8.2.0. Also, the corresponding procedure shall be used at MBMS session stop where the NodeB+ informs its UEs about removed S-CCPCH configurations.

Further Information

The method of using RRC containers for one or more embodiments disclosed herein is similar to the method used over Iu interface in 3GPP TS 25.413 in the Target RNC to Source RNC Transparent Container IE. However, one significant difference is that the RRC message included in a given container is received by a NodeB+ but is not forwarded unchanged on the Uu interface. Instead, the receiving NodeB+ decodes the RRC message and uses the content to define the IEs of other RRC messages that are sent on the Uu interface. Another difference is that a cell identity IE in the RNSAP message defines the cell in the sending NodeB+ that is related to the content of the RRC container.

The teachings herein disclose different ways of including the information from the four RRC messages contemplated herein. For at least some implementations, there are advantages in including at least MBMS COMMON P-T-M RB INFORMATION and MBMS CURRENT CELL P-T-M RB INFORMATION as RRC containers. The information of the other two messages may either be conveyed by including them in containers or by adding the required information elements directly in an RNSAP message as RNSAP information elements. The teachings herein thus also contemplate and provide for the case where all required information is extracted from the four RRC messages and included as information elements directly in an RNSAP message as RNSAP information elements. Thus, the teachings disclosed herein encompass any combination of RNSAP information elements and RRC containers, as sent from one base station (e.g., NodeB+) to another base station, for the sharing of MBMS configuration information between the base stations.

MAC Level Coordination Prior to MBMS Session Start

For soft combining plus MAC multiplexing across inter-NodeB+ neighbor cells, a NodeB+ needs to have knowledge of the next MBMS logical channel to use prior to reception of an MBMS session start message. This can be achieved with O&M configuration under the following limiting conditions:
  an external cell shall not be defined as a neighbor to its own cell if the set of MBMS service areas mapped to the external cell differs from the set of MBMS service areas mapped to the own cell; and
  an external cell shall not be defined as a neighbor to its own cell if the NodeB+ controlling the external cell is under a different SGSN.

With these limitations, the order of MBMS sessions to be set up is normally predictable in NodeB+ neighbors. The MBMS session stop will also be requested in the same pattern towards different NodeB+ neighbors. It will then be possible to define and configure an algorithm on how to pick the next MBMS logical channel that, in the normal case, will ensure that the same logical channel is used by all neighbor NodeB+s for a MBMS session. A simple example is a rule that always picks the MBMS logical channel code point that has the lowest value of the unused code points.

Also, it is helpful to consider recovery from abnormal cases, because using the wrong neighbor cell configuration may completely corrupt a UE's soft/selective combining, for reception of an MBMS session from a cell or group of cells. Further, the selection of an MBMS logical channel ID may be disturbed if a RANAP MBMS session start or stop message is delayed, received out of sequence or lost. There is a low risk for this to happen as the Iu CP transport path differs between the NodeB+s. However if the RNSAP procedure "MCCH Information Transfer" is used in line with the description above, a NodeB+ may, when receiving the MCCH INFORMATION TRANSFER message, first verify that the configuration of the cells of the sending NodeB+ is aligned and possible for soft combining, i.e., that the MBMS logical channel ID is aligned for all MBMS sessions.

A given NodeB+ thus will not accept an inter-NodeB+ neighbor cell as a neighbor cell if the neighbor cell is not aligned. The consequence of a mismatch is that the soft/selective combining gain is lost for this particular MBMS session, but this consequence is acceptable as the condition should occur only rarely. Adding this check, the NodeB+ actions when receiving the MCCH INFORMATION TRANSFER message are:
  use the information in the RNSAP message and the RRC container(s) to identify valid neighbor cells for soft/selective combining in the NodeB+ that is the sender of the message for each new MBMS session;
  verify that the configuration of the neighbor cell retrieved in step 1 is appropriate for the selected combining type;
  if S-CCPCH configuration is not already known by configuration, retrieve the S-CCPCH configuration in the neighbor cells identified and verified in the above steps; and
  update MBMS COMMON P-T-M RB INFORMATION with the S-CCPCH configuration of the third step and announce the neighbor cells (identified in above first and second steps) with MBMS NEIGHBOURING CELL P-T-M RB INFORMATION. Send the RRC messages on MCCH according to the normal rules of 3GPP TS 25.331 v8.2.0.

Counting UEs in Neighbor NodeB+

The teachings herein provide a solution for counting MBMS UEs across NodeB+ borders and the reporting of Radio Bearer (RB) configurations (p-t-p/p-t-m) over the inter-base station Iur interface. More particularly, in one embodiment, such counting is accomplished using the new class 2 RNSAP procedure, MCCH Information Transfer, as described above. The following assumptions on configuration requirements are:
  Controlling Radio Network Controller (CRNC) may request a UE to perform the MBMS counting procedure. This is done by setting the MBMS required UE action IE in the MBMS MODIFIED SERVICES message to the value "Acquire counting info" or "Acquire counting info-PTM RBs unmodified";
  when a NodeB+ invokes the MCCH Information Transfer procedure as described herein, the RRC MBMS MODIFIED SERVICES message containing the IE MBMS required UE action can be found in the RRC container. This information can be used by the NodeB+ receiving the MCCH INFORMATION TRANSFER message to identify own cells that are neighbors to cells for which the sending NodeB+ performs counting, receiving NodeB+ can then perform counting in these cells and inform sending NodeB+ about the result over Iur.

If a mapping between the intra-frequency cell ID to cell identity that is used when communicating over Iur is included in the RNSAP message, the receiving node can read the MBMS NEIGHBOURING CELL P-T-M RB INFORMATION included in the RRC container and verify that neighbor cells found via the O&M configuration actually are signaled as neighbors by the sending NodeB+. If not, there is no need to perform counting in the cells of the receiving node.

NodeB+ Actions when Receiving MCCH INFORMATION TRANSFER Message

In the RRC containers contemplated herein for exchanging MBMS configuration information between NodeB+s, one NodeB+ may receive the MCCH INFORMATION TRANSFER message from another NodeB+, where the message contains the MBMS MODIFIED SERVICES message in the RRC container. Further, the MBMS required UE action IE may be set to the value "Acquire counting info" or "Acquire counting info-PTM RBs unmodified". In such cases, the receiving NodeB+ does the following:
  uses the information in the RNSAP message and the RRC container(s) to identify the cells (controlled by the sending NodeB+) in which MBMS counting is performed by sending NodeB+;
  identifies which of the cells retrieved in the first step above that are valid neighbor cells, i.e., previously contained in MBMS NEIGHBOURING CELL P-T-M RB INFORMATION sent on MCCH in a cell controlled by the receiving NodeB+;
  identifies the own cells that are neighbors to the cells retrieved in the second step above. UEs camped in these own cells may be in selective/soft combining with the cells retrieved in the second step, and where counting is performed by the neighbor NodeB+, hence counting in these cells is beneficial for the evaluation of p-t-p, p-t-m radio bearer configuration in the neighbor NodeB+;
  performs counting in the cells identified in the third step; and
  sends the result of the counting to the NodeB+ that originally initiated the MCCH INFORMATION TRANSFER message together with the cell identity that is used when communicating over Iur for each cell with a counting result.

The teachings herein also provide a method to use the new RNSAP procedure MCCH Information Transfer for the purpose of reporting the result of the counting. Here, the NodeB+ receiving the external counting information may use that in an algorithm for selection of p-t-p or p-t-m RB configuration. Further, as a variant of the above counting procedure, the step of reading the received MBMS NEIGHBOURING CELL P-T-M RB INFORMATION can be omitted for simplicity, with the consequence that unnecessary counting is performed.

Report RB Configuration (p-t-p, p-t-m) to Neighbor NodeB+.

In a RAN, when a CRNC elects to provide an MBMS session using p-t-p instead of p-t-m (or vice versa), UEs are informed using the RRC messages on the MCCH. Hence, in a flat RAN, if those RRC messages are sent to neighbor NodeB+s using the new RNSAP procedure taught herein—i.e., the MCCH Information Transfer—full information about the status transfer between p-t-p and p-t-m RB configuration can be retrieved.

When a NodeB+ receives the MCCH INFORMATION TRANSFER message containing information about an RB configuration change (p-t-p/p-t-m) in a neighbor cell, it performs the following actions:
(1) uses the information in the RNSAP message and the RRC container(s) to identify the cells (controlled by the sending NodeB+) for which the RB configuration for a MBMS session is changed;
(2) for p-t-m->p-t-p changes, it identifies which of the cells retrieved in step 1 that are valid neighbor cells, i.e. previously contained in MBMS NEIGHBOURING CELL P-T-M RB INFORMATION message sent on the MCCH in a cell controlled by the receiving NodeB+;
(3) identifies its own cells that that are neighbors to the cells retrieved in step 2;
(4) removes the p-t-p cells retrieved in step 2 from the neighbor cells listed for selective/soft combining, and announces this update in the own cells retrieved in step 3—the announcement is made using the RRC message MBMS NEIGHBOURING CELL P-T-M RB INFORMATION;
(5) for p-t-p->p-t-m changes, it identifies which of the cells retrieved in step 1 are configured neighbor cells and (6) correspondingly identifies which of its own cells are neighbors to these configured neighbor cells; and
(7) adds the p-t-m cells retrieved in step 5 to the neighbor cells for selective/soft combining and announces this in the own cells retrieved in step 6, using the RRC message MBMS NEIGHBOURING CELL P-T-M RB INFORMATION.

The above processing is improved if a synchronized change p-t-m to p-t-p is added. Then the NodeB+ that intends to do a switch to p-t-p decides in which transmission frame number the change will take place. The frame number is sent in an RNSAP message before the change takes place. Then the neighbor cell is removed at exactly the right time and not after the actual change has been performed by the neighbor NodeB+. Synchronization of the NodeB+s makes this improvement practical.

Single Frequency Networks (SFNs) and MBSFN

For MBSFN, all cells of an MBSFN cluster belong to the same service area. Therefore a list of S-CCPCH and/or MBMS logical channel numbers may be pre-configured, identically in all NodeB+s in the cluster. If the MBMS session start is guaranteed to be received in all NodeB+s in the same order (and never lost) and corresponding guarantees are valid for MBMS session stop, the selection of S-CCPCH and/or MBMS logical channel number becomes predictable. For this solution to work, however, there must be a way to recover from an abnormal condition. Otherwise, MBMS sessions may be corrupted over a large area.

Further, it should be noted that the solution described herein for coordination of MBMS Logical Channel IDs is not possible in an MBSFN cluster, because neighbors for selective/soft combining are not announced on the MCCH. Another requirement is that the messages on the MCCH have to be as closely coordinated in time as done for the MTCH. It may not be realistic to rely on O & M configuration for achieving the required degree of MCCH synchronization. As such, the teachings herein provide a synchronization solution based on timestamps. Here, an SFN controlling NodeB+ originates and synchronizes MCCH transmission based on such timestamps.

The MBSFN Controlling RNS

A NodeB+ can, according to the teachings proposed herein, use the Iur interface to forward to neighboring NodeB+s copies of what it is has sent on its MCCH via its Uu interface. Further, those inter-node exchanges can be based on including such information in RRC containers. More particularly, a given NodeB+ can send such information to a neighboring NodeB+ using the MCCH INFORMATION TRANSFER message, and timestamps can be included in that message. Such timestamps can be used to synchronize the MCCH across an SFN cluster.

When an SFN cluster is defined comprising several RNSs (several NodeB+s), one of the RNSs is assigned the SFN controlling RNS. At MBMS session start (which would be handled by all RNSs in a coordinated way as all RNSs belongs to the same MBMS service area) only one RNS (the SFN controlling RNS) prepares what is to be sent out on the MCCH with the MCCH acquisition procedure. The other RNSs (non SFN controlling RNS) read the RANAP message and prepare to receive an RNSAP message MCCH INFORMATION TRANSFER from the MBSFN controlling RNS. The MCCH INFORMATION TRANSFER contains a time stamp and other timing related information that will control exactly how the RRC messages are sent out in synchronization in all of the MBSFN cells in the cluster.

The MBSFN controlling RNS performs certain actions upon receiving MBMS session start, including these:
(1) preparing the setup of the requested MBMS sessions in the same way as in classical architecture (i.e., as would be done in a hierarchical RAN);
(2) assembling the RRC messages to later be sent on the MCCH in the MCCH acquisition procedure;
(3) sending the RNSAP MCCH INFORMATION TRANSFER message to all RNSs of the MBSFN cluster—the MCCH INFORMATION TRANSFER message shall contain all RRC messages to be sent to the cells of the MBSFN cluster in RRC message container(s), as well as timestamp and other timing related information; and
(4) based on the timing information in step 3, sending out the RRC messages assembled in step 2 at correct point in time.

The Non-controlling MBSFN RNSs

Each non-controlling MBSFN RNS in the cluster performs certain actions upon receiving MBMS session start, including these items:
(1) preparing the setup of the requested MBMS sessions in the same way as in classical architecture; and
(2) instead of preparing RRC messages and physical configuration, waiting for an Iur MCCH INFORMATION TRANSFER message that is related to the MBMS session to be setup.

Further, these non-controlling RNSs perform these actions upon receiving the MCCH INFORMATION TRANSFER message:
(1) reading the RRC messages and identifying the physical configuration to be used;
(2) preparing the physical channel and other L1 preparations that are required;
(3) reading the RRC messages and identifying the connection to pending MBMS sessions as received over Iu;
(4) if steps 1-3 are successfully carried out, proceeding with Iu and RANAP handling according to the controlling standards; and
(5) using the timestamp and other timing information and sending out the RRC messages received in the containers at correct point in time.

Extensions to the Controlling RNS Teachings

As an alternative to the above teachings, a cell group is identified, rather than an MBSFN cluster, and a controlling NodeB+ is defined within the cell group. Further, the distribution of RRC messages to be sent out on the MCCH is done as within the MBSFN cluster described above, but with no requirement on timing synchronization (i.e. timestamps are not needed).

This alternative method has several merits, including the advantage that it does not impose limitations on the combination of L1 multiplexing and MAC multiplexing. Also, this alternative method can also be used to distribute the content of an MSCH for L1 combining scheduling. In addition to not requiring the timestamp-based synchronization of the preceding teachings, this alternative method has the characteristic that the content of the RRC messages to be sent out on the MCCH will differ from cell to cell. The main reason for these differences is that the channelization code and the scrambling code of the S-CCPCH differs between the different cells. The S-CCPCH configuration to use in each cell is determined by the controlling NodeB+ and based on the configuration.

General, Non-limiting Advantages

Flat-architecture RANs, such as described herein, complicate MBMS, as the aggregation point that coordinates the synchronization for such services is moved to the enhanced NodeBs (NodeB+s). Absent the teachings presented herein, in a flat architecture, the largest SFN area and soft combining area are shrunk to the coverage area of one NodeB+.

In that regard, the teachings presented herein allow UEs to perform selective and/or soft combining of MBMS signals across cells that are controlled by different NodeB+s. In particular, by configuring neighboring NodeB+s to send each other the same RRC messages that each transmits to its own-cell UEs for MBMS configuration, a given NodeB+ can provide its own-cell UEs with MBMS configuration for neighboring cells. Such data may be pushed from one neighboring NodeB+ to another, or pulled from one NodeB+ by another.

In either case, the UEs in a given cell can acquire the MCCH and MTCH signals being transmitted in one or more neighboring cells and therefore perform selective and/or soft combining of the MTCH signals from multiple cells. In particular, the teachings presented herein provide for soft (L1) combining or control plane synchronization for the case of MBSFN and, more broadly, provide complete solutions for all standardized MBMS configurations and combining schemes.

Of course, the present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of sharing Multimedia Broadcast Multicast Services (MBMS) configuration information between neighboring first and second base stations in a flat architecture Radio Access Network (RAN), the method comprising sending one or more Radio Resource Control (RRC) messages from the first base station to the second base station via an inter-base station interface, wherein the one or more RRC messages sent from the first base station to the second base station are transmitted by the first base station over an air interface of the first base station to user equipment served by the first base station, for providing the user equipment with MBMS user plane configuration information for one or more cells controlled by the first base station.

2. The method of claim 1, further comprising the first base station sharing MBMS control channel content and timing information with the second base station.

3. The method of claim 2, wherein the first base station operates as a controlling Radio Network Controller (RNC), in an MBMS Single Frequency Network (SFN), cluster that includes the second base station, and wherein the method further comprises the first base station determining the MBSM control channel content and timing information to be shared with and used by the second base station.

4. The method of claim 1, wherein sending the one or more RRC messages comprises placing Multicast Control Channel (MCCH), acquisition procedure RRC messages into one or more RRC message containers, and sending the RRC message containers to the second base station in one or more Radio Network Subsystem Application Part (RNSAP), messages.

5. The method of claim 1, wherein the first base station further shares with the second base station information about a number of mobile terminals or other user equipment receiving MBMS traffic from the first base station.

6. The method of claim 1, further comprising the first base station determining whether to change from point-to-multipoint transmission of MBMS traffic to point-to-point transmission of MBMS traffic, based at least in part on receiving information from the second base station about a number of mobile terminals or other user equipment receiving MBMS traffic from the second base station.

7. The method of claim 1, further comprising the first base station determining whether to change from point-to-point transmission of MBMS traffic to point-to-multipoint transmission of MBMS traffic, based at least in part on receiving information from the second base station about a number of mobile terminals or other user equipment receiving MBMS traffic from the second base station.

8. The method of claim 1, further comprising the first base station sending information to the second base station indicating MBMS transmission mode changes, wherein the first base station changes between a point-to-multipoint transmission mode and a point-to-point transmission mode.

9. The method of claim 1, further comprising the first base station sending cell identity information as part of or in association with sending the one or more RRC messages to the second base station, to indicate to the second base station the identities of the cells associated with the MBMS configuration information being shared.

10. A first base station for operation in a flat architecture Radio Access Network, RAN, said first base station comprising:
processing circuits configured for preparing user plane configuration information for transmission; and
a transceiver configured to transmit one or more Radio Resource Control (RRC), messages via its air interface to user equipment served by the first base station, for providing the user equipment with Multimedia Broadcast Multicast Services (MBMS), user plane configuration information, for one or more cells controlled by the first base station, and to share that MBMS user plane configuration information with a neighboring second base station by sending the one or more RRC messages to the second base station via an inter-base station interface.

11. The first base station of claim 10, wherein the first base station is further configured to share MBMS control channel content and timing information with the second base station.

12. The first base station of claim 10, wherein the first base station is configured for operation as a controlling Radio Network Controller (RNC), in an MBMS Single Frequency Network (SFN), cluster that includes the second base station, and is further configured to determine the MBMS control channel content and timing information for the MBMS SFN cluster, and to share the MBMS control channel content and timing information with the second base station.

13. The first base station of claim 10, wherein the first base station is configured to send the one or more RRC messages to the second base station by placing Multicast Control Channel (MCCH), acquisition procedure RRC messages into one or more RRC message containers, and sending the RRC message containers to the second base station in one or more Radio Network Subsystem Application Part (RNSAP), messages.

14. The first base station of claim 10, wherein the first and second base stations are NodeB+s configured for operation in a flat architecture Wideband Code Division Multiple Access (WCDMA), network, and wherein the inter-base station interface comprises an Iur interface between the NodeB+s.

15. The first base station of claim 10, wherein the first base station is further configured to share with the second base station information about a number of mobile terminals or other user equipment receiving MBMS traffic from the first base station.

16. The first base station of claim 10, wherein the first base station is further configured to determine whether to change from point-to-multipoint transmission of MBMS traffic to point-to-point transmission of MBMS traffic, based at least in part on receiving information from the second base station about a number of mobile terminals or other user equipment receiving MBMS traffic from the second base station.

17. The first base station of claim 10, wherein the first base station is further configured to determine whether to change from point-to-point transmission of MBMS traffic to point-to-multipoint transmission of MBMS traffic, based at least in part on receiving information from the second base station about a number of mobile terminals or other user equipment receiving MBMS traffic from the second base station.

18. The first base station of claim 10, wherein the first base station is further configured to send information to the second base station indicating MBMS transmission mode changes, wherein the first base station changes between a point-to-multipoint, p-t-m, mode and a point-to-point, p-t-p, mode.

19. The first base station of claim 10, wherein the first base station is further configured to send cell identity information as part of or in association with sending the one or more RRC messages to the second base station, to indicate to the second base station the identities of the cells associated with the MBMS configuration information being shared.

20. The first base station of claim 10, wherein the inter-base station interface comprise an Iur interface between the first and second base stations.

\* \* \* \* \*